Patented May 25, 1954

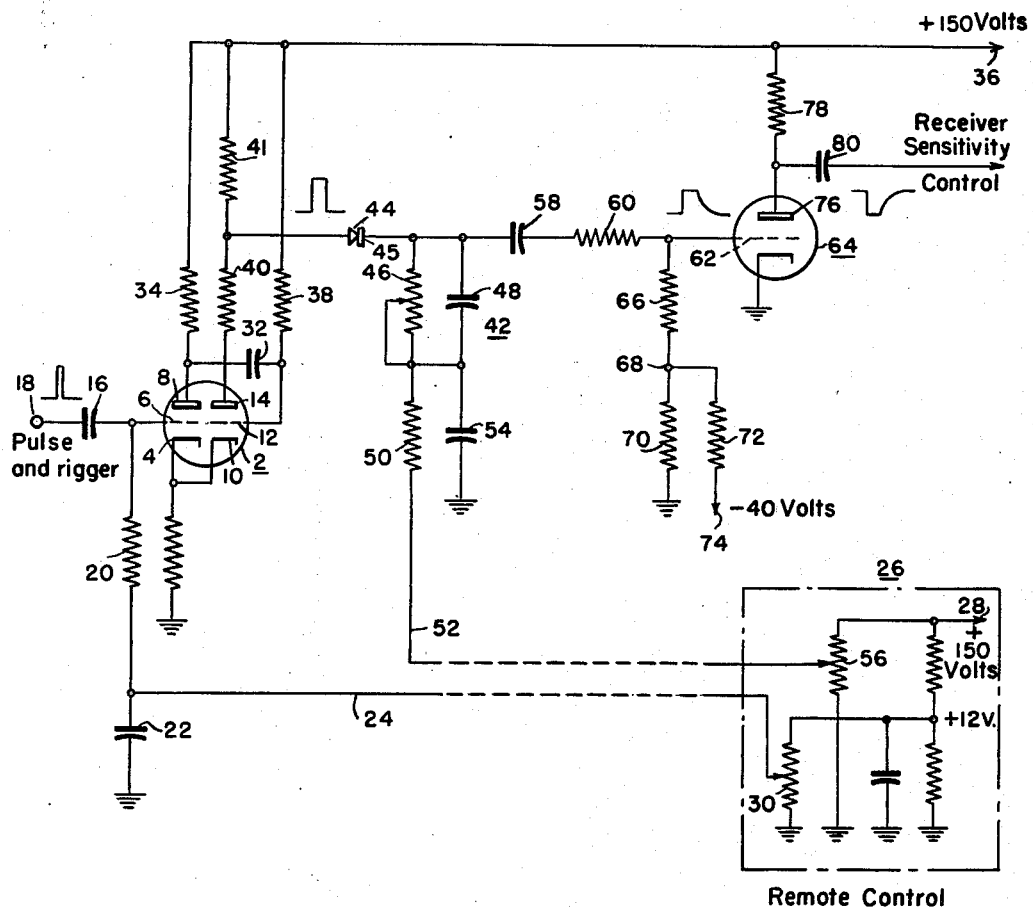

2,679,589

UNITED STATES PATENT OFFICE 2,679,589

SENSITIVITY TIME CONTROL WITH REMOTE CONTROL

Kent M. Mack, Baltimore, Md., assignor to Westinghouse Electric Corporation, East Pittsburgh, Pa., a corporation of Pennsylvania Application August 25, 1951, Serial No. 243,718

2 Claims. (Cl. 250—27)

My invention relates to electronic controls and more particularly to sensitivity time control circuits.

In accordance with the prior art of which I am aware, sensitivity time control circuits have been used in radar systems to reduce the receiver gain of the system during the transmitted pulse and for some predetermined time interval thereafter. This reduction in gain is necessary in order to permit the display on a conventional radar type indicator of the large signals received by the system from close targets, while permitting the use of a substantially larger gain for targets which are more distant from the receiver. Since the function of the sensitivity time control circuits is to improve the useful range of information available to the radar operator, it is desirable that the controls for determining the operation of the sensitivity time control circuits should be located at a position which is convenient to the radar operator. However, it is frequently desirable that the radar operator be located at a large distance from the radar receivers. Accordingly, it has been the custom in the prior art either to place the sensitivity time control circuits near the radar operator and to transmit the pulses produced by these circuits to the radar receiver, or, as is more common, to sacrifice the advantages of direct operator control by placing the sensitivity time control circuits at the radar receiver. Placing the control circuits near the radar operator has the disadvantage that where the operator is located several hundred feet from the receiver a long coaxial transmission line must be used to preserve the sensitivity time control pulse shape. Such an arrangement requires that the sensitivity time control produce a very high power output and this in turn requires a relatively large output tube. Thus either solution of the prior art has not been satisfactory.

It is accordingly an object of my invention to provide a circuit for the remote control of a sensitivity time control circuit.

An ancillary object of my invention is to provide an apparatus for sensitivity time control which will not require a large output tube.

Still another ancillary object of my invention is to provide a remote control circuit for the control of a multivibrator tube.

Still another object of my invention is to provide a remote control circuit for the control of a clipper circuit.

The novel features which I consider characteristic of my invention are set forth with more particularity in the appended claims. The invention, however, with respect to both the organization and the operation thereof, together with other objects and advantages may be best understood from the following description of specific embodiments when read in connection with the accompanying drawing in which the single figure is a schematic showing of an apparatus embodying my invention.

In accordance with my invention, I provide a multivibrator tube 2 comprising a master and a slave circuit. The master circuit comprises a master cathode 4, a master grid 6 and a master anode 8. The slave circuit comprises a slave cathode 10, a slave grid 12 and a slave anode 14. The master grid 6 is provided with a connection through a capacitance 16 to a source of trigger pulses 18. The master grid 6 is also connected through a resistance 20 and a condenser 22 in series to ground. Connected between the resistance 20 and the condenser 22 which are connected between the master grid 6 and ground is a master grid control conductor 24 leading to a remote control circuit 26. This remote control circuit 26 comprises a source of potential 28 connected through a multivibrator control resistor 30 to ground. The conductor leading from the master grid 6 is connected to the multivibrator control resistor 30 so as to be variable with respect thereto. Thus, by varying the connection between the master grid conductor 24 and the multivibrator control resistor 30 we are able to vary the potential which is applied to the master grid 6. The master cathode 4 and the slave cathode 10 are connected together and through a resistor to ground. The master anode 8 is connected through a condenser 32 to the slave grid 12 and is connected through a resistance 34 to a positive source of potential 36. The slave grid 12 is also connected through a resistor 38 to a positive source of potential. The slave anode 14 is connected through a slave anode resistor 40 to a clipper circuit 42 and is also connected through the slave anode resistor 40 in series with another resistor 41 to the source of positive potential 36.

The clipper circuit 42 comprises a rectifier 44, such as a diode crystal which is connected so as to receive a potential which is responsive to the current between the cathode 10 and the anode 14 of the slave circuit. The output from the rectifier 44 is connected through a variable resistance 46 in parallel with a condenser 48 and thence through a time constant resistance 50 to a clipper control conductor 52. One end of the variable resistance 46 is also connected through a time constant condenser 54 to ground. The time constant provided by the time constant resistance 50 and the time constant condenser 54 should be sufficiently long to prevent any substantial change during a single sensitivity time control pulse in the voltage to which the clipper is returned. The clipper control conductor 52 is connected to a clipper control resistor 56 so as to be variable with respect thereto. The clipper control resistor 56 is connected between a source of positive potential 28 and ground. Thus, by varying the point of contact between the clipper control conductor 52 and the clipper control resistor 56 the potential applied to the clipper circuit 42 may be varied and thereby the action of the clipper circuit 42 on pulses received thereby may be controlled. The diode clipper circuit 42 is driven from a circuit having a relatively low source impedance so that the leading edge of the sensitivity time control pulse has a short rise-time.

Connected to the output of the clipper circuit 42 through a condenser 58 and resistance 60 in series is the grid 62 of an amplifier tube 64. The grid 62 of the amplifier tube 64 is connected through a resistance 66 to a terminal 68. The terminal 68 is then connected through a first resistance 70 to ground and through a second resistance 72 to a source of negative potential 74. The plate 76 of the amplifier tube 64 is connected through an amplifier plate resistance 78 to a source of positive potential 36 and is also connected through a capacitor 80 to a receiver sensitivity control so as to cause the receiver sensitivity control to be responsive to the current through the amplifier tube 64.

In the operation of my device, the duration or pulse width of the multivibrator output is determined by the D. C. voltage to which the master grid 6 is returned at the end of the trigger pulse. By varying the voltage applied to the master grid 6 from the remote control circuit 26 the time interval during which the receiver gain is reduced may be varied. The positive pulse output of the multivibrator is direct coupled to a diode clipper circuit 42. The clipper level of the diode clipper circuit 42 may be varied by adjusting the D. C. voltage to which the clipper cathode returns at the end of the pulse. By varying the voltage to which the negative side 45 of the diode rectifier 44 is returned at the completion of a pulse the amplitude of the pulse applied to the input of the output amplifier may be varied. Thus, the action of the clipper 42 on the pulses received thereby may be controlled by changing the potential applied thereto by the clipper control circuit 26. The variable resistor 46 provided in the clipper circuit 42 varies the time constant of the clipper circuit 42 which determines the shape of the trailing edge of the pulse applied to the output amplifier tube 64. There is thus provided a means of varying the manner in which the gain control of the radar receiver recovers from the effect of the sensitivity time control pulses. The desired shape of this recovery can usually be determined in advance and does not change for a wide variety of conditions. It is therefore satisfactory to place this control at the receiver where it may be preset instead of placing it at the location of the operator. The amplifier produces a pulse which is inverted and amplified in response to the pulse receiver from the clipper circuit. The pulse leaving the amplifier has thus been properly shaped and it may be applied directly to the receiver sensitivity control system. It should be noted that the amplifier need not be matched to the receiver sensitivity control system or to the cable interconnecting the two units. My apparatus, therefore, is not subject to the disadvantage of the prior art types of apparatus in which it was necessary to match the amplifier to the receiver gain control and to the cable interconnecting the two units.

While I have described an embodiment of my invention having particular applicability to a radar receiver sensitivity control apparatus, it is nevertheless understood that such a control may be employed with types of apparatus other than radar.

Although I have shown and described specific embodiments of my invention, I am aware that other modifications thereof are possible. My invention, therefore, is not to be restricted except insofar as is necessitated by the prior art and the spirit of the invention.

I claim as my invention:

1. A receiver sensitivity control comprising a multivibrator having a control element, connections for applying pulses to said control element, means for applying a variable direct-current potential to said control element so as to superimpose said direct-current potential on said pulses, a clipper circuit connected to said multivibrator so as to receive a pulse in response to current through said multivibrator, means for applying a variable direct-current potential to said clipper circuit so as to control the action of said clipper circuit on pulses received from said multivibrator, an amplifier inverter connected to said clipper so as to receive pulses therefrom, and connections for applying a potential responsive to the current through said amplifier to a receiver sensitivity control.

2. A sensitvity time control circuit comprising a multivibrator having a control element, means for applying a variable direct-current potential to said control element, connections for applying a series of pulses to said control element so as to superimpose them on the direct-current potential supplied by said means, a variable clipper circuit connected to receive the output from said multivibrator, said clipper circuit comprising a variable resistance having a capacitance in parallel therewith, a crystal connected between said resistance and said multivibrator, means for applying a variable potential to the opposite end of said resistance from that to which said crystal is connected, a sensitivity control, and connections for applying the output of said clipper circuit to said sensitivity control.

References Cited in the file of this patent

UNITED STATES PATENTS

| Number | Name | Date |
| --- | --- | --- |
| 2,402,916 | Schroeder | June 25, 1946 |
| 2,427,523 | Dolberg et al. | Sept. 16, 1947 |
| 2,432,204 | Miller | Dec. 9, 1947 |
| 2,441,963 | Gray | May 25, 1948 |
| 2,486,106 | Brown | Oct. 25, 1949 |
| 2,552,348 | Shapiro et al. | May 8, 1951 |
| 2,556,457 | Watts | June 12, 1951 |
| 2,583,173 | Hargens | Jan. 22, 1952 |
| 2,624,044 | Schooley | Dec. 30, 1952 |
| 2,624,871 | Meagher | Jan. 6, 1953 |
| 2,624,875 | Patterson | Jan. 6, 1953 |